United States Patent
Odorovic et al.

(10) Patent No.: US 11,146,662 B2
(45) Date of Patent: *Oct. 12, 2021

(54) METHOD AND SYSTEM OF TRANSMITTING STATE BASED INPUT OVER A NETWORK

(71) Applicant: NVIDIA Corporation, Santa Clara, CA (US)

(72) Inventors: Aleksandar Odorovic, Santa Clara, CA (US); Andrija Bosnjakovic, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/718,374

(22) Filed: Dec. 18, 2019

(65) Prior Publication Data
US 2020/0153941 A1    May 14, 2020

Related U.S. Application Data

(63) Continuation of application No. 13/682,561, filed on Nov. 20, 2012, now Pat. No. 10,547,713.

(51) Int. Cl.
*H04L 29/06* (2006.01)
*G06F 3/038* (2013.01)

(52) U.S. Cl.
CPC .............. *H04L 67/38* (2013.01); *G06F 3/038* (2013.01); *H04L 69/16* (2013.01)

(58) Field of Classification Search
CPC .......... H04L 67/38; H04L 69/16; G06F 3/038
See application file for complete search history.

(56) References Cited

U.S. PATENT DOCUMENTS

| 5,557,724 | A  | 9/1996  | Sampat et al. |
|-----------|----|---------|---------------|
| 6,279,029 | B1 | 8/2001  | Sampat et al. |
| 6,408,436 | B1 | 6/2002  | de Haas |
| 6,421,050 | B1 | 7/2002  | Ruml et al. |
| 6,579,184 | B1 | 6/2003  | Tanskanen |
| 10,547,713 | B2 | 1/2020 | Odorovic et al. |
| 2002/0080399 | A1 | 6/2002 | Nakagawa |
| 2003/0229900 | A1 | 12/2003 | Reisman |
| 2004/0043758 | A1 | 3/2004 | Sorvari et al. |
| 2004/0167893 | A1 | 8/2004 | Matsunaga et al. |
| 2004/0243257 | A1 | 12/2004 | Theimer |

(Continued)

FOREIGN PATENT DOCUMENTS

JP    2010142527 A  *  7/2010
WO    2013095512 A1     6/2013

*Primary Examiner* — Viet D Vu

(74) *Attorney, Agent, or Firm* — Shook, Hardy & Bacon L.L.P.

(57) ABSTRACT

A system and method for transmitting state based input over a network are presented. Embodiments of the present invention are operable to generate vector data comprising a composite of all state data associated with the state of all user input claims of a client system and transmit the vector data from the client device to a host device over a network. Embodiments of the present invention are further operable at the host device to determine a simulated input state at the client side by performing a comparison of the vector data currently received to a last known vector data and rendering output in response to the comparison.

20 Claims, 8 Drawing Sheets

(56) References Cited

U.S. PATENT DOCUMENTS

| | | |
|---|---|---|
| 2005/0060411 A1 | 3/2005 | Coulombe et al. |
| 2006/0156375 A1 | 7/2006 | Konetski |
| 2006/0200253 A1 | 9/2006 | Hoffberg et al. |
| 2007/0067462 A1 | 3/2007 | Takeda |
| 2007/0220363 A1 | 9/2007 | Aggarwal et al. |
| 2008/0137690 A1 | 6/2008 | Krantz et al. |
| 2008/0304483 A1 | 12/2008 | Williams et al. |
| 2009/0074162 A1 | 3/2009 | Ryskamp |
| 2009/0248793 A1 | 10/2009 | Jacobsson et al. |
| 2010/0052843 A1 | 3/2010 | Cannistraro |
| 2010/0030245 A1 | 12/2010 | Epstein et al. |
| 2011/0078332 A1 | 3/2011 | Poon |
| 2011/0090305 A1 | 4/2011 | Ikeda et al. |
| 2011/0106743 A1 | 5/2011 | Duchon |
| 2011/0222787 A1 | 9/2011 | Thiemert et al. |
| 2011/0276157 A1 | 11/2011 | Wang et al. |
| 2012/0060109 A1 | 3/2012 | Han et al. |
| 2012/0092299 A1 | 4/2012 | Harada et al. |
| 2012/0151693 A1 | 6/2012 | Jang et al. |
| 2012/0212570 A1 | 8/2012 | Herz et al. |
| 2012/0272148 A1 | 10/2012 | Strober |
| 2012/0272149 A1 | 10/2012 | Lee et al. |
| 2012/0280907 A1 | 11/2012 | Masaki et al. |
| 2012/0296964 A1 | 11/2012 | Chaturvedi et al. |
| 2012/0306737 A1 | 12/2012 | Sweet |
| 2013/0111019 A1 | 5/2013 | Tjew et al. |
| 2013/0129303 A1 | 5/2013 | Lee et al. |
| 2013/0151693 A1 | 6/2013 | Baker et al. |
| 2013/0173390 A1 | 7/2013 | Polo |
| 2013/0173689 A1 | 7/2013 | Stonefield et al. |
| 2013/0179542 A1 | 7/2013 | Wang et al. |
| 2013/0250761 A1 | 9/2013 | Shatzkamer et al. |
| 2013/0290905 A1 | 10/2013 | LuVogt et al. |
| 2013/0322251 A1 | 12/2013 | Kotecha et al. |
| 2013/0332511 A1 | 12/2013 | Hala et al. |
| 2014/0029701 A1 | 1/2014 | Newham et al. |
| 2014/0040364 A1 | 2/2014 | Baldwin et al. |
| 2014/0040493 A1 | 2/2014 | Baldwin |
| 2014/0053025 A1 | 2/2014 | Marvasti et al. |
| 2014/0122656 A1 | 5/2014 | Baldwin et al. |
| 2014/0156854 A1 | 6/2014 | Gaetani, Jr. |
| 2014/0253674 A1 | 9/2014 | Grondal et al. |
| 2014/0324960 A1 | 10/2014 | Pattan |
| 2014/0368604 A1 | 12/2014 | Lalonde et al. |

\* cited by examiner

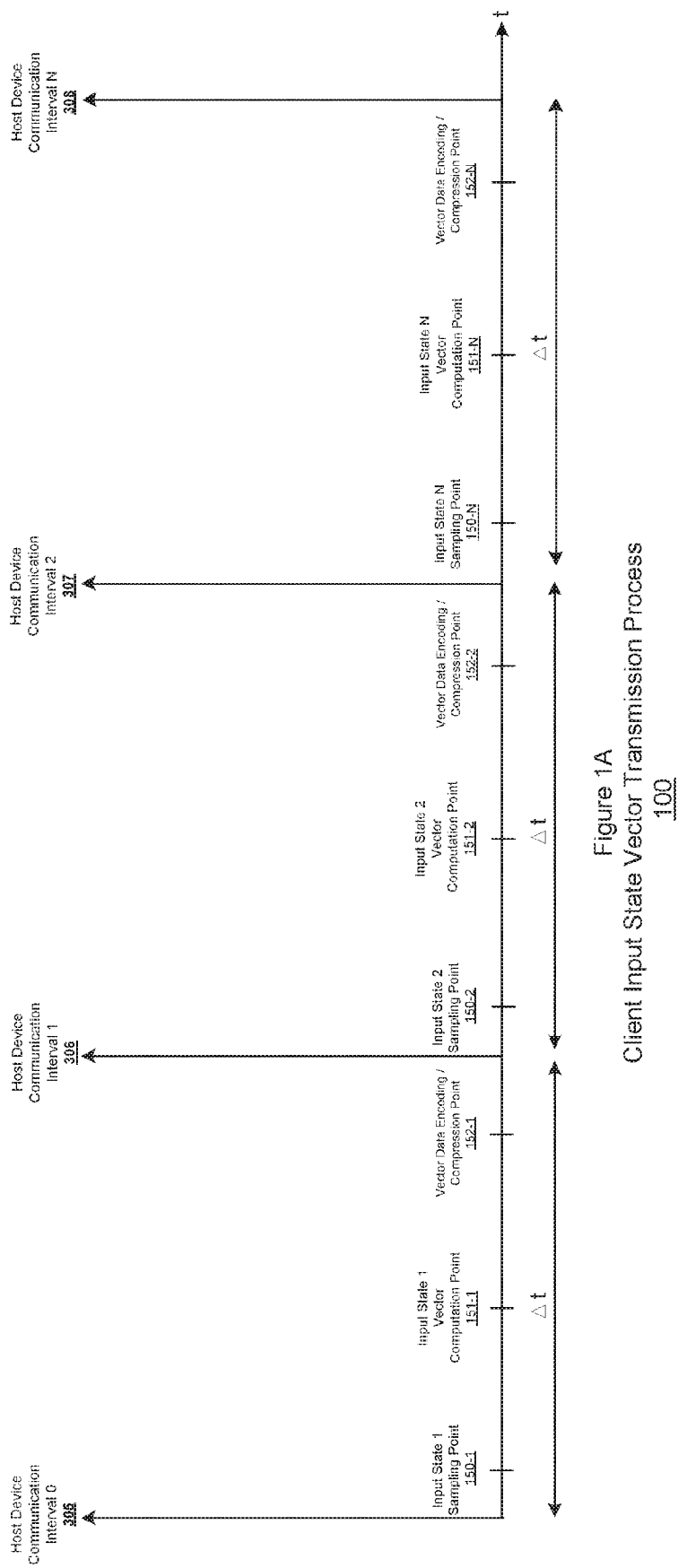

Client Input State Vector Transmission Process
100

Client Input State Vector Transmission Process
100

METHOD AND SYSTEM OF TRANSMITTING STATE BASED INPUT OVER A NETWORK

CROSS-REFERENCE TO RELATED APPLICATIONS

This application is a continuation of Ser. No. 13/682,561, filed on Nov. 20, 2012, which is hereby incorporated by reference in its entirety.

FIELD OF THE INVENTION

Embodiments of the present invention are generally related to the field of network communication devices.

BACKGROUND

When transmitting user input to a remote device using conventional network transmission methods (e.g., TCP), data packets carrying the input data are repeatedly transmitted until there is confirmation of receipt from the remote device. Under this approach, these conventional methods assume that such repetition will improve the probability that the data will reach its target destination. However, such approach (waiting for confirmation and transmission repetition) actually introduces significant network delay, especially within poor quality networks where multiple attempts are often needed for successful transmission. The significant round-trip delay time (RTD) associated with this approach is especially costly for real-time gaming applications as any delays in game interaction negatively impact the end user's experience. This issue is especially prevalent within the field of cloud computing technology.

Conventional methods transmit these user input events as they happen and, as a consequence, input data transmitted from remote client devices may get lost during transmission, which may lead to a corrupt input state scenario on a host device. The scenario results in the host device receiving data consisting of unintended changes to the original data sent by the client device. As a result, the host device is then forced to render output based on corrupt data.

SUMMARY OF THE INVENTION

Accordingly, a need exists for a system and/or method that can address the problems described above. Embodiments of the present invention are operable to generate vector data comprising state data of the current states of all user inputs of the client device and periodically transmit the vector data from the client device to a host device over a network. Embodiments of the present invention are further operable at the host device to determine a current input state at the client side by performing a comparison of the vector data currently received to previously received vector data and rendering output in response to the comparison.

More specifically, in one embodiment, the present invention is implemented as a method of remote network communication. The method includes receiving a current vector data from a remote device over a communication network, the current vector data comprising a composite state representation of the state for all user input devices of the remote device. In one embodiment, the user input devices comprise keyboard, mouse and gamepads. In one embodiment, the communication network utilizes User Datagram Protocol (UDP) technology. In one embodiment, the communication network utilizes Transmission Control Protocol (TCP) technology. In one embodiment, the receiving process occurs at fixed time intervals. In one embodiment, the receiving process occurs at varying time intervals.

Additionally, the method includes determining simulated user input by performing a comparison of the current vector data to a previously known and stored vector data. The method of determining further includes determining differences between the current vector data and the previously known vector data. Additionally, the method of determining further includes replacing the previously known vector data with the current vector data if the current vector data is different from the previously known vector data. Also, the method of determining further includes maintaining the previously known vector data if the current vector data is the same as the previously known vector data.

In one embodiment, the present invention is implemented as another method for remote network communication. The method includes sampling user input states of a plurality of user input devices of a remote client device at a current time. In one embodiment, the plurality of user input devices comprise a keyboard, a cursor directing device and a gamepad.

Additionally, the method includes computing a current vector data representation of the user input states. In one embodiment, the user input states comprise a composite state representation of states for all the plurality of user input devices coupled to the remote device. Also, the method further includes transmitting the current vector data representation to a remote device over a communication network as well as repeating the aforementioned sampling, computing and transmitting processes. In one embodiment, the method of transmitting further includes encoding the current vector data representation as well as compressing the current vector data representation. In one embodiment, the transmitting process occurs at fixed time intervals. In one embodiment, the transmitting process occurs at varying time intervals. In one embodiment, the communication network utilizes User Datagram Protocol (UDP) technology. In one embodiment, the communication network utilizes Transmission Control Protocol (TCP) technology.

In one embodiment, the present invention is implemented as an apparatus for communicating with a client device over a communication network. The apparatus includes a communication module operable to receive a current vector data from the client device over the communication network, in which the current vector data represents a composite of user input state data across a plurality of user input devices of the client device. In one embodiment, the plurality of user input devices comprise a keyboard, a cursor directing device and a gamepad. In one embodiment, the communication network utilizes User Datagram Protocol (UDP) technology. In one embodiment, the communication network utilizes Transmission Control Protocol (TCP) technology. In one embodiment, the communication module is operable to receive the current vector data at fixed time intervals. In one embodiment, the communication module is operable to receive the current vector data at varying time intervals.

Additionally, the apparatus also includes a comparison module operable to determine simulated user input by performing a comparison of the current vector data to a previously known vector data. The comparison module is further operable to determine differences between the current vector data and the previously known vector data, in which further the comparison module is operable to replace the previously known vector data with the current vector data if the current vector data is different from the previously known vector data, and where the comparison module is further operable to maintain the previously known vector data if the current vector data is the same as the previously known vector data.

Also, the apparatus further includes a rendering module operable to render a display output in response to a determination made by the comparison module. Furthermore, the apparatus further includes a transmission module operable to transmit the display output to the client device.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1A presents an illustration of a method of remote communication depicting the flow of data between a client device and a host device in accordance to embodiments of the present invention.

DETAILED DESCRIPTION

Figure 1B:
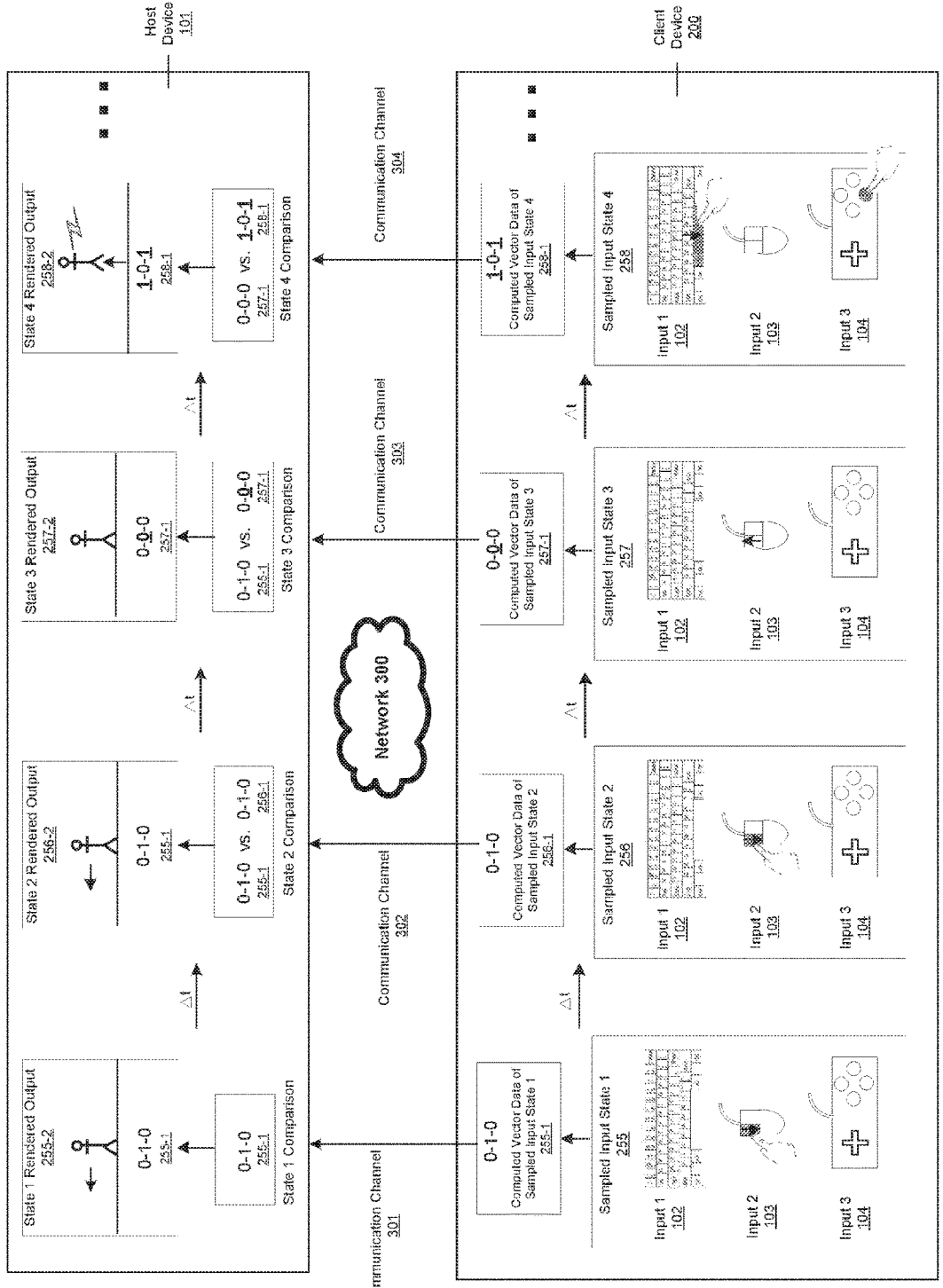
FIG. 1B presents another illustration of a method for remote communication depicting the flow of data between a client device and a host device in accordance to embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIG. 2, FIG. 4) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Exemplary Method of Transmitting State Based Input Over A Network

FIG. 1A provides an exemplary input state vector transmission process between host device 101 and client device 200 in accordance with embodiments of the present invention. As illustrated in FIG. 1A, during input state 1 sampling point 150-1, the state of all user inputs coupled to device 200 are captured. After capturing this data, client device 200 then proceeds to compute vector data associated with the input state just sampled during input state 1 vector computation point 151-1. Once the vector data is computed, the data is then subsequently encoded and may be compressed during vector data encoding/compression point 152-1. In one embodiment, once the vector data is encoded and compressed, it may then be transmitted to a remote host device, such as host device 101, during communication interval 1 306 for further processing by embodiments of the present invention.

Upon the completion of the transmission of the state vector data during communication interval 1 306, the process captures the state of all inputs coupled to device 200 at input state 2 sampling point 150-2. After capturing this data, client device 200 then proceeds to compute vector data associated with the input state sampled during input state 2 vector computation point 151-2. Once the vector data is computed, the data is then subsequently encoded and/or compressed during vector data encoding/compression point 152-2. Once the vector data is encoded and/or compressed, it is then transmitted to a remote host device, such as host device 101, during communication interval 2 307 for further processing by embodiments of the present invention.

Similarly, upon the completion of the transmission of the state vector data during communication interval 2 307, the process captures the state of all inputs coupled to device 200 at input state N sampling point 150-N. After capturing this data, client device 200 then proceeds to compute vector data associated with the input state sampled during input state N vector computation point 151-N. Once the vector data is computed, the data is then subsequently encoded and/or compressed during vector data encoding/compression point 152-N. Once the vector data is encoded and/or compressed, it is then transmitted to a remote host device, such as host device 101, during communication interval N 308 for further processing by embodiments of the present invention.

Embodiments of the present invention may be configured to execute a number of communication intervals between client device 200 and host device 101 during fixed time periods or varying time periods in order to convey the input state vector data to the remote host device.

FIG. 1B illustrates an exemplary communication interval between host device 101 and client device 200 in accordance with embodiments of the present invention. Although FIG. 1B depicts an embodiment of the present invention being used within a video game setting, embodiments of the present invention are not restricted solely to such settings and support other application types as well. Furthermore, embodiments of the present invention are operable to support network configurations in which a host device, e.g. host device 101, is not coupled to a display screen. Embodiments of the present invention may also support network configurations in which a host device is a centralized server or datacenter. Additionally, embodiments of the present invention may support configurations in which host device 101 is operable to execute multiple instantiations of an application in parallel (concurrently) using virtual host paradigm (virtual machines).

Network 300 may be a wireless network, a wired network, or a combination thereof. Embodiments of the present invention are operable to support conventional network protocols (e.g., UDP, TCP or similar protocols). Communication channels 301 through 304 may be one or more network sockets created within network 300, which enable both host device 101 and client device 200 to receive and transmit data packets over network 300. Upon receiving the data packets through network 300, host device 101 may proceed to decompress and decode the packets.

Vector comparison module 138 (see FIG. 3A) then performs a comparison of the current input state vector data received during the current communication interval against the last known vector state of the client device and computes any differences. The differences are translated into discrete simulated user input events by host device 101, which uses graphics system 141 (see FIG. 3A), for instance, to render output data in response to the difference determination made by vector comparison module 138 in accordance with an application program. In one embodiment, once the graphics system processes the simulated user input, rendered outputs may be encoded by encoding module 133, compressed by compression module 134, and then transmitted back to a client device over network 300 for display on the client device.

As discussed supra, vector data represents a complete set of the present state of all user inputs captured at the client device during a sampling point just prior to transmission. In one embodiment of the present invention, vector data may include the composite state of user input devices through keyboard activity, mouse input and/or gamepad activity (e.g., trigger-button activity on a gamepad) for instance. Furthermore, embodiments of the present invention may be configured to perform a number of input state transmissions between client device 200 and host device 101 during fixed or varying time intervals to convey the state data to the host device. Although FIG. 1B depicts a single client device, embodiments of the present invention are operable to support the use of multiple clients.

As illustrated in sampled input state 1 255 of FIG. 1B, client device 200 captures mouse left-button-down input from input 2 103. The composite input state received from input 2 103 may then be computed as state vector data 255-1. Therefore, state vector data 255-1 may represent the state of the complete set of inputs received from client device 200 during a sampling point. In one embodiment, state vector data 255-1 may be a complex variable encapsulating a number of different atomic event codes (e.g., buttons pressed, mouse coordinates), each associated with a respective input device that is coupled to client device 200. Therefore, the vector data then represents the current state of all of the user inputs, in encoded fashion, across the communication interval to which the vector pertains.

Table I provides an exemplary computed state vector data which represents the current state of all the user inputs coupled to a particular client device (e.g., keyboard, mouse, joystick, and gamepad):

TABLE I

| keys_pressed = {'x', 'y', 'z'}; | | | |
|---|---|---|---|
| | mouse_x = 123;<br>mouse_y = 456;<br>mouse_left_click = false;<br>mouse_right_click = true; | joystick_up = false;<br>joystick_down = true;<br>joystick_left = true;<br>joystick_right = false; | gamepad_right = false;<br>gamepad_left = true;<br>gamepad_fire_button = true;<br>gamepad_trigger_button = false; |
| Keyboard State<br>Input Component | Mouse State Input<br>Component | Joystick State Input<br>Component | Gamepad Buttons<br>Component |

For simplification purposes, however, FIG. 1B represents vector data as being comprised of three separate fields: Keyboard State—Mouse State—Gamepad State, in which input received is depicted as "1" and input not received is depicted as "0". The first field represents state data input received through keyboard activity; the second field represents state data input received through mouse activity, and the third field represents state data input received through gamepad activity. In one embodiment, client device 200 captures this input state, computes the vector data and then transmits this data from client device 200 to host device 101 over network 300 through communication channel 301 via data packets a number of times during predetermined time intervals. Data packets may be encoded and compressed prior to delivery over network 300 using conventional encoding and compression techniques.

Once the data is received by host device 101, host device 101 may then begin to perform a comparison using vector comparison module 138. Vector comparison module 138 is operable to compare the current input state vector data just received to the last known vector state of the client device stored in host device 101. After performing the state comparisons, host device 101 will determine a simulated user input and will render output in response to the vector data comparisons performed by comparison module 138 (e.g., state 1 rendered output 255-2 of stick figure moving in left direction in response to the mouse left-click-down input from input 2 103). At this point, state vector 255-1 represents the stored state vector (e.g., last known vector) that vector comparison module 138 uses for future input state comparisons within host device 101. In one embodiment, state 1 rendered output 255-2 may be then encoded, compressed and delivered over network 300 to client device 200 for display on the client device.

As depicted in sampled input state 2 256, client device 200 captures continued mouse left-click-down input from input 2 103. Client device 200 captures the data received from input 2 103, computes it as state vector 256-1 and then transmits this data from client device 200 to host device 101 over network 300 through communication channel 302 via data packets. Once the data is received by host device 101, vector comparison module 138 compares the last known vector state of the client device, state vector data 255-1, to the current input vector data just received, state vector data 256-1. In one embodiment of the present invention, vector comparison module 138 determines that there are no differences between the vector data and, therefore, host device 101 continues to use state vector data 255-1 as the current input state stored in host device 101.

As depicted in sampled input state 3 257, client device 200 captures mouse left-click-up input from input 2 103 (i.e., mouse button is released). Client device 200 captures the data received from input 2 103, computes it as state vector 257-1 and then transmits this data from client device 200 to host device 101 over network 300 through communication channel 303 via data packets. Once the data is received by host device 101, vector comparison module 138 compares the last known vector state of the client device, state vector data 255-1, to the current input vector data just received, state vector data 257-1. In one embodiment of the present invention, comparison module 138 determines that there is a difference between the vector data, and therefore, host device 101 renders output in response to the differences determined (e.g., state 3 rendered output 257-2 of stick figure no longer moving in left direction). At this point, state vector data 257-1 now represents the current input state stored in host device 101.

As depicted in sampled input state 4 258, client device 200 captures gamepad bottom-button-down input from input 3 104 as well as keyboard spacebar-button-down input from input 1 102. Client device 200 captures the data received from input 1 102 and input 3 104, computes it as state vector 258-1 and then transmits this data from client device 200 to host device 101 over network 300 through communication channel 304 via data packets. Once the data is received by host device 101, vector comparison module 138 compares the last known vector state of the client device, state vector data 257-1, to the current input vector data just received, vector data 258-1. In one embodiment of the present invention, vector comparison module 138 determines that there is a difference between the vector data, and therefore, host device 101 renders output in response to the differences, (e.g., state 4 rendered output 258-2 of stick figure jumping and firing a weapon). At this point, state vector data 258-1 now represents the current input state stored in host device 101.

Figure 1C:
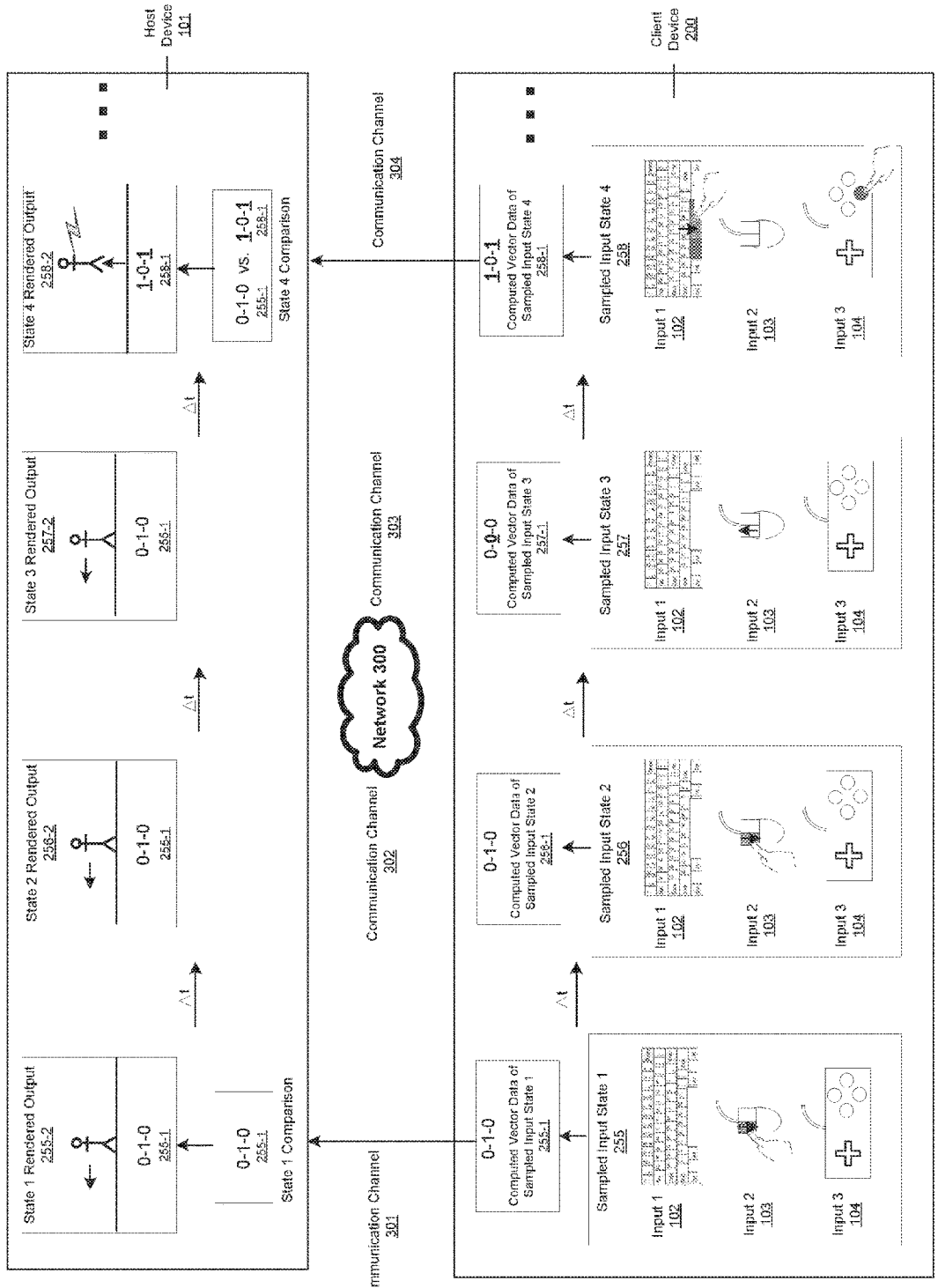
FIG. 1C presents another illustration of a method for remote communication depicting the flow of data between a client device and a host device in accordance to embodiments of the present invention.

FIG. 1C provides another exemplary input state vector transmission process between host device 101 and client device 200 in accordance with embodiments of the present invention. FIG. 1C depicts a similar process to 1B; however, FIG. 1C further illustrates a scenario in which several vector data transmissions fail to reach the host device, as may be expected in all network channels. In these scenarios, embodiments of the present invention offer the advantage of still providing this simulated user data based on the encoded vectors received during the next successful transmission between the host device and the client device.

As illustrated in sampled input state 1 255, client device 200 captures mouse left-click-down input from input 2 103. The composite state of the input received from input 2 103 may be computed as state vector data 255-1. Once the data is received by host device 101 via communication channel 301, host device 101 may then begin to perform a comparison using vector comparison module 138. After performing the state comparisons, host device 101 will render output in response to the vector data comparisons performed by vector comparison module 138 (e.g., state 1 rendered output 255-2 of stick figure moving in left direction). At this point in state 1, vector 255-1 represents the current input state that comparison module 138 uses for future state comparisons within host device 101. In one embodiment, state 1 rendered output 255-2 may be then encoded, compressed and delivered over network 300 to client device 200 for display on the client device.

As depicted in sampled input state 2 256, client device 200 captures continued mouse left-click-down input from input 2 103. Client device 200 captures the data received from input 2 103, computes it as state vector 256-1 and then attempts to transmit this data from client device 200 to host device 101 over network 300 through communication channel 302 via data packets. However, due to network issues, the vector data is never received by host device 101. As a result, host device 101 continues to use state vector data 255-1 as the current input state stored in host 101.

As depicted in sampled input state 3 257, client device 200 captures mouse left-click-up input from input 2 103 (e.g., mouse button is released). Client device 200 captures the data received from input 2 103, computes it as state vector 257-1 and then also attempts to transmit this data from client device 200 to host device 101 over network 300 through communication channel 303 via data packets. However, similar to the situation with State 2 256, due to network issues, the vector data is never received by host device 101. As a result, host device 101 still continues to use state vector data 255-1 as the current input state stored in host 101.

As depicted in sampled input state 4 258, client device 200 captures gamepad bottom-button-down input from input 3 104 as well as keyboard spacebar-button-down input from input 1 102. Client device 200 captures the data received from input 1 102 and input 3 104, computes it as state vector 258-1 and then transmits this data from client device 200 to host device 101 over network 300 through communication channel 304 via data packets. Furthermore, the encoded vector that is delivered to host device 101 also includes the vector data that host device 101 failed to receive during state 3 (e.g., fingers no longer pressing the buttons on mouse). Once the data is received by host device 101, vector comparison module 138 compares the last known vector state of the client device, state vector data 255-1, to the current input vector data just received, state vector data 258-1. In one embodiment of the present invention, comparison module 138 determines that there is a difference between the vector data. Accordingly, host device 101 renders output in response to the differences (e.g., state 4 rendered output 258-2 of stick figure firing a weapon and jumping).

As discussed supra, host device 101 may recognize the previous failures to deliver the vector data associated with sampled input state 2 256 and sampled input state 3 257 during previous transmissions times and, therefore, using the differences computed, may be operable to render output data that logically precedes the state vector data just received (e.g., host device 101 may render output of stick figure no longer moving in left direction). Therefore, state vector data 258-1 additionally encodes the actions performed during sampled input State 3 257. Furthermore, state vector data 258-1 now represents the current input state.

Figure 2:
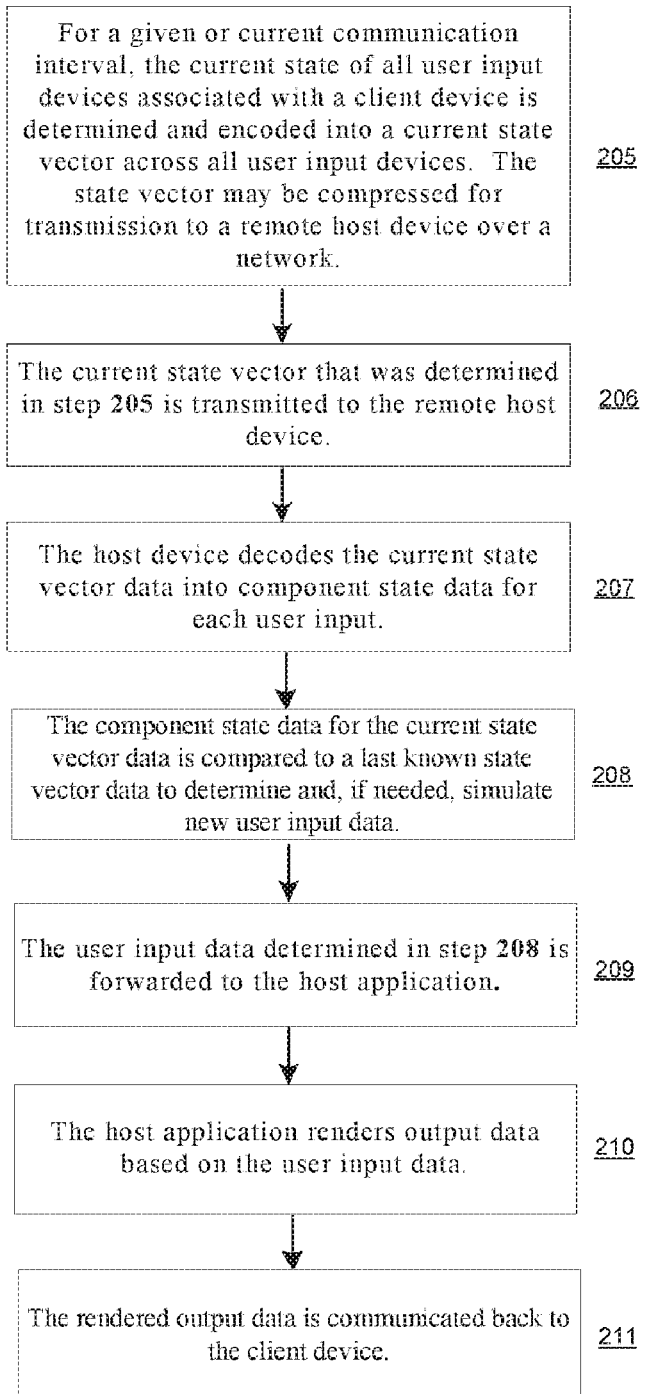
FIG. 2 is a flowchart of an exemplary method of remote communication over a network in an embodiment according to the present invention.

FIG. 2 presents a flow chart which describes exemplary steps in accordance with the various embodiments herein described.

At step 205, for a given or current communication interval, the current state of all user input devices associated with a client device is determined and encoded into a current state vector across all user input devices. The state vector may be compressed for transmission to a remote host device over a network.

At step 206, the current state vector that was determined in step 205 is transmitted to the remote host device.

At step 207, the host device decodes the current state vector data into component state data for each user input.

At step 208, the component state data for the current state vector data is compared to a last known state vector data to determine and, if needed, simulate new user input data.

At step 209, user input data is forwarded to the host application.

At step 210, the host application renders output data based on the user input data.

At step 211, the rendered output data is communicated back to the client device.

Exemplary Host Device

Figure 3A:
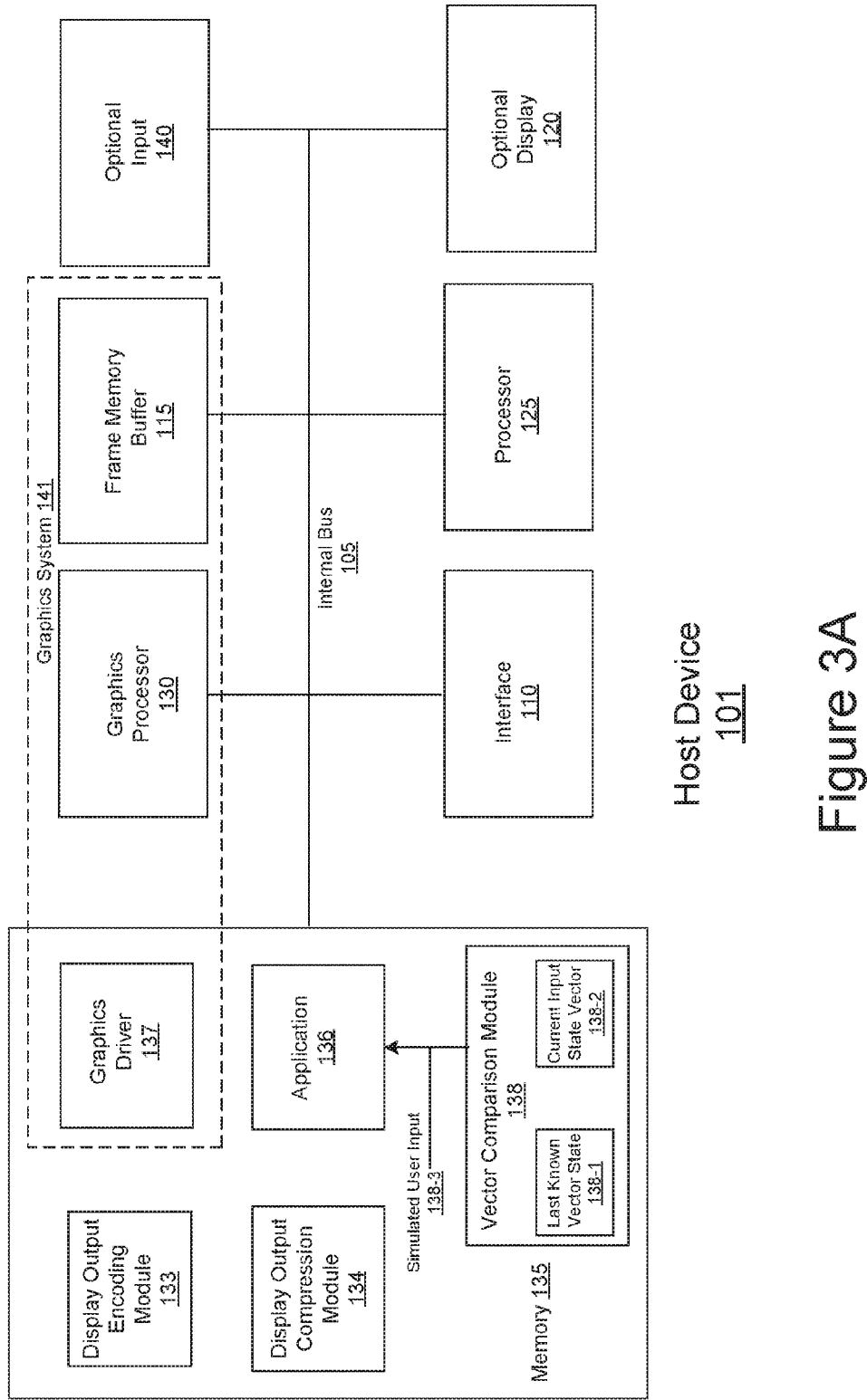
FIG. 3A is a block diagram of an example of a host device capable of implementing embodiments according to the present invention.

As presented in FIG. 3A, an exemplary host device 101 upon which embodiments of the present invention may be implemented is depicted. Furthermore, exemplary host device 101 may be implemented as a server, laptop, desktop computer or the like, as contemplated by embodiments of the present invention. In one embodiment of the present invention, host device 101 may be a virtualized server device in a data center.

Host device 101 includes processor 125 which processes instructions from application 136 located in memory 135 to read data received from interface 110 via internal bus 105. Optionally, processor 125 may also execute instructions from an operating system located in memory 135. Optional input 140 includes devices that communicate user inputs from one or more users to host device 101 and may include keyboards, mice, joysticks, touch screens, and/or microphones. In one embodiment of the present invention, application 136 represents a set of instructions that are capable of using user inputs such as touch screen input, in addition to peripheral devices such as keyboards, mice, joysticks, touch screens, and/or microphones, or the like. Interface 110 allows host device 101 to communicate with other computer systems via an electronic communications network, including wired and/or wireless communication and including the Internet. The optional display device 120 is any device capable of rendering visual information in response to a signal from host device 101.

Graphics system 141 comprises graphics driver 137, graphics processor 130 and frame memory buffer 115. Graphics driver 137 is operable to assist graphics system 141 in generating a stream of rendered data to be delivered to a client device by providing configuration instructions to graphics processor 130. Graphics processor 130 may process instructions from application 136 to read and write data in frame memory buffer 115 and to communicate data with processor 125 via internal bus 105 for rendering the data on display device 120. Graphics processor 130 generates pixel data for output images from rendering commands and may be configured as multiple virtual graphic processors that are used in parallel (concurrently) by a number of applications, such as application 136, executing in parallel.

Frame memory buffer 115 may be used for storing pixel data for each pixel of an output image. In another embodiment, frame memory buffer 115 and/or other memory may be part of memory 135 which may be shared with processor 125 and/or graphics processor 130. Additionally, in another embodiment, host device 101 may include additional physical graphics processors, each configured similarly to graphics processor 130. These additional graphics processors may be configured to operate in parallel with graphics processor 130 to simultaneously generate pixel data for different portions of an output image, or to simultaneously generate pixel data for different output images.

In one embodiment, vector comparison module 138 is operable to compare incoming current input state vector data 138-2 received through interface 110 to a last known vector state data 138-1 stored in memory. After performing the comparisons, vector comparison module 138 will then compute any differences determined and send the output, in the form of simulated user input 138-3, to application 136. Graphics system 141 may then render output in response to the simulated user input 138-3. Display output compression module 134 is operable to compress the input received via interface 110 using conventional methods of data compression. Display output compression module 134 may also be operable to decompress compressed data received via interface 110 using conventional methods as well.

Display output encoding module 133 is operable to encode rendered data produced by graphics system 141 into conventional formats using conventional methods of encoding data. Also, display output encoding module 133 may also be operable to decode input received via interface 110 using conventional methods. In one embodiment of the present invention, display output compression module 134 and display output encoding module 133 may be implemented within a single application, such as application 136, or reside separately, in separate applications.

Exemplary Client Device

Figure 3B:
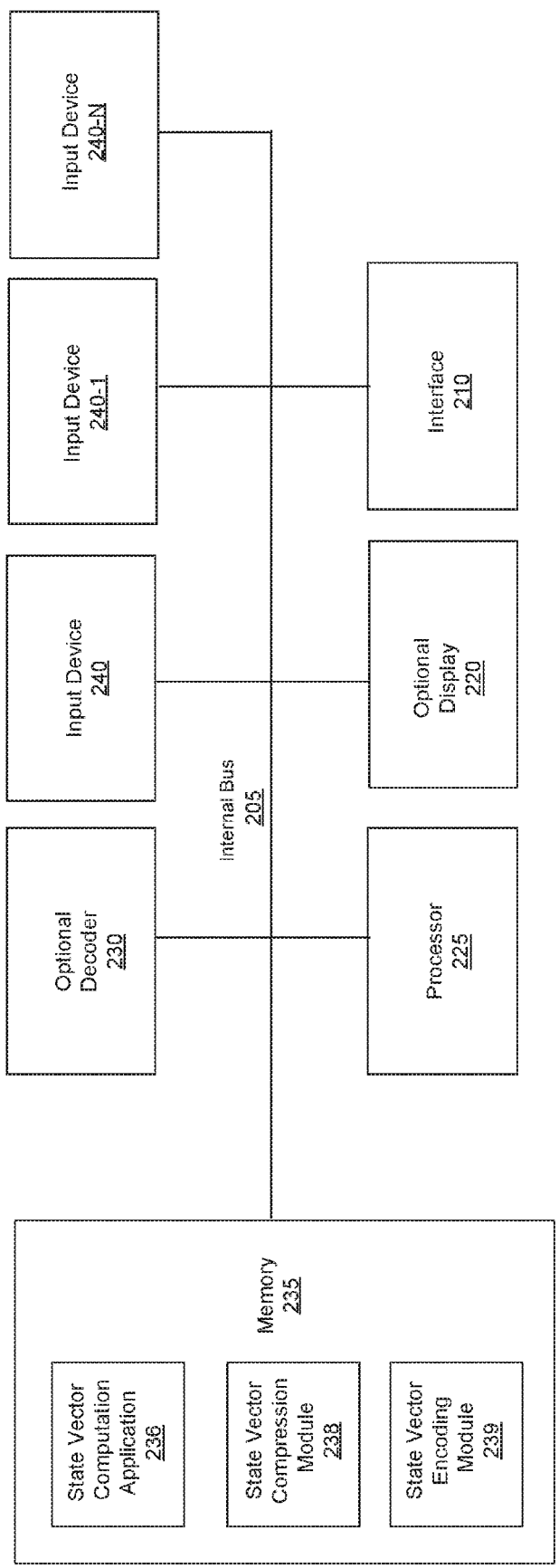
FIG. 3B is a block diagram of an example of a client device capable of implementing embodiments according to the present invention.

FIG. 3B provides an exemplary client device upon which embodiments of the present invention may be implemented is depicted. Client device 200 may be implemented as a remote streaming client device which may communicate with other host computer systems (e.g., host device 101 of FIG. 3A). Furthermore, client device 200 may be any type of device that has the capability to receive inputs from a user and send such inputs to a host computer, such as host device 101. Client device 200 may be a mobile device with a touch screen interface that is operable to send control information (e.g., user inputs) to host device 101 over the network 300.

Client device 200 includes a processor 225 for running software applications and optionally an operating system. User input devices 240 through 240-N are operable to communicate user inputs from one or more users through the use of keyboards, mice, joysticks, and/or microphones, or the like. Interface 210 allows client device 200 to communicate with other computer systems (e.g., host device 101 of FIG. 3A) via an electronic communications network, including wired and/or wireless communication and including the Internet.

In one embodiment of the present invention, state vector computation application 236 represents a set of instructions that are capable of capturing user inputs over the input devices 240 through 240-N and computing vector data representing the captured input state. Furthermore, state vector computation application 236 is operable to read state vector information from all input devices coupled to client device 200 and compute the corresponding state vector data.

In one embodiment of the present invention, client device 200 may include decoder 230, which is any device capable of decoding (decompressing) data that is encoded (compressed). In one embodiment of the present invention, decoder 230 may be an H.264 decoder. In one embodiment of the present invention, client device 200 may include the display device 220, which is any device capable of rendering visual information, including information received from the decoder 230. In one embodiment, display device 220 is used to display visual information received from host device 101; furthermore, display device 220 may be further operable to detect user commands executed via touch screen technology or similar technology. The components of the client device 200 are connected via one or more internal bus 205.

State vector compression module 238 is operable to compress the input using convention methods of data compression. State vector compression module 238 may also be operable to decompress compressed input received via interface 210 using conventional methods as well. State vector encoding module 239 is operable to encode the input into conventional formats using conventional methods of encoding data.

Relative to the host device 101, client device 200 may have fewer components and less functionality and, as such, may be referred to as a thin client. However, the client device 200 may include other components including those described above. Client device 200 may also have additional capabilities beyond those discussed above.

Figure 4:
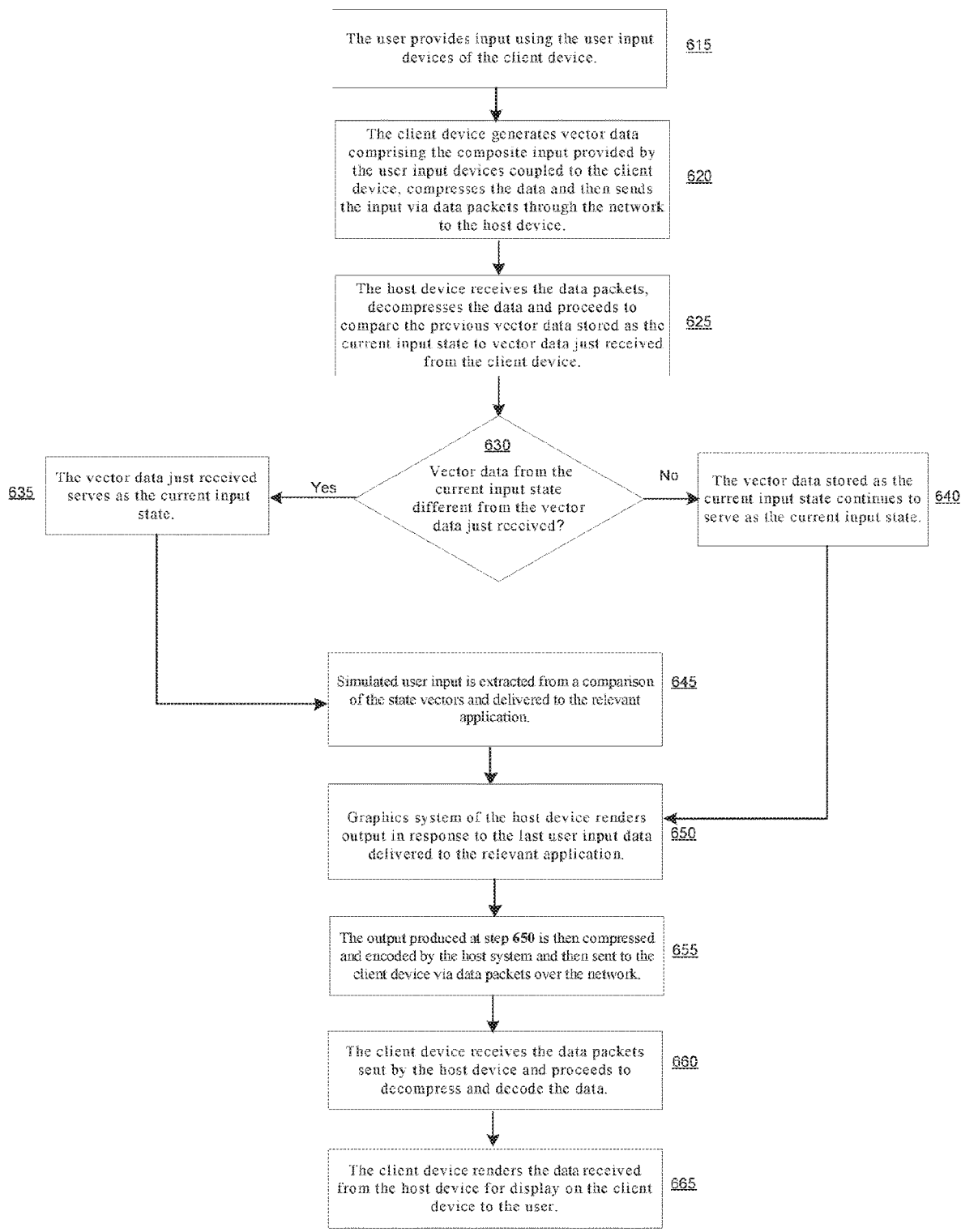
FIG. 4 is another flowchart of an exemplary method of remote communication over a network in an embodiment according to the present invention.

FIG. 4 is another flowchart which describes exemplary steps in accordance with the various embodiments herein described.

At step 615, the user provides input using the user input devices of the client device.

At step 620, the client device generates vector data comprising the composite input provided by the user input devices coupled to the client, compresses the data and then sends the input via data packets through the network to the host device.

At step 625, the host device receives the data packets, decompresses the data and proceeds to compare the previous vector data stored as the current input state to vector data just received from the client device.

At step 630, a determination is made as to whether the vector data from the current input state is different from the vector data just received by the host from the client device. If the vector data is different, then the vector data just received serves as the current input state, as detailed in step 635. If the vector data is the same, then the vector data stored as the current input state continues to serve as the current input state, as detailed in step 640.

At step 635, the vector data is determined to be different, therefore, the vector data just received serves as the current input state.

At step 640, the vector data is determined to be the same, therefore, the vector data stored as the current input state continues to serve as the current input state.

At step 645, the simulated user input is extracted from a comparison of the state vectors and delivered to the relevant application.

At step 650, the graphics system of the host device renders output in response to the last user input data delivered to the relevant application.

At step 655, the output produced at step 650 is then compressed and encoded by the host device, and then sent to the client device over the network.

At step 660, the client device receives the data packets sent by the host device and proceeds to decompress and decode the data.

At step 665, the client device renders the data received from the host device for display on the client device to the user.

Figure 5:
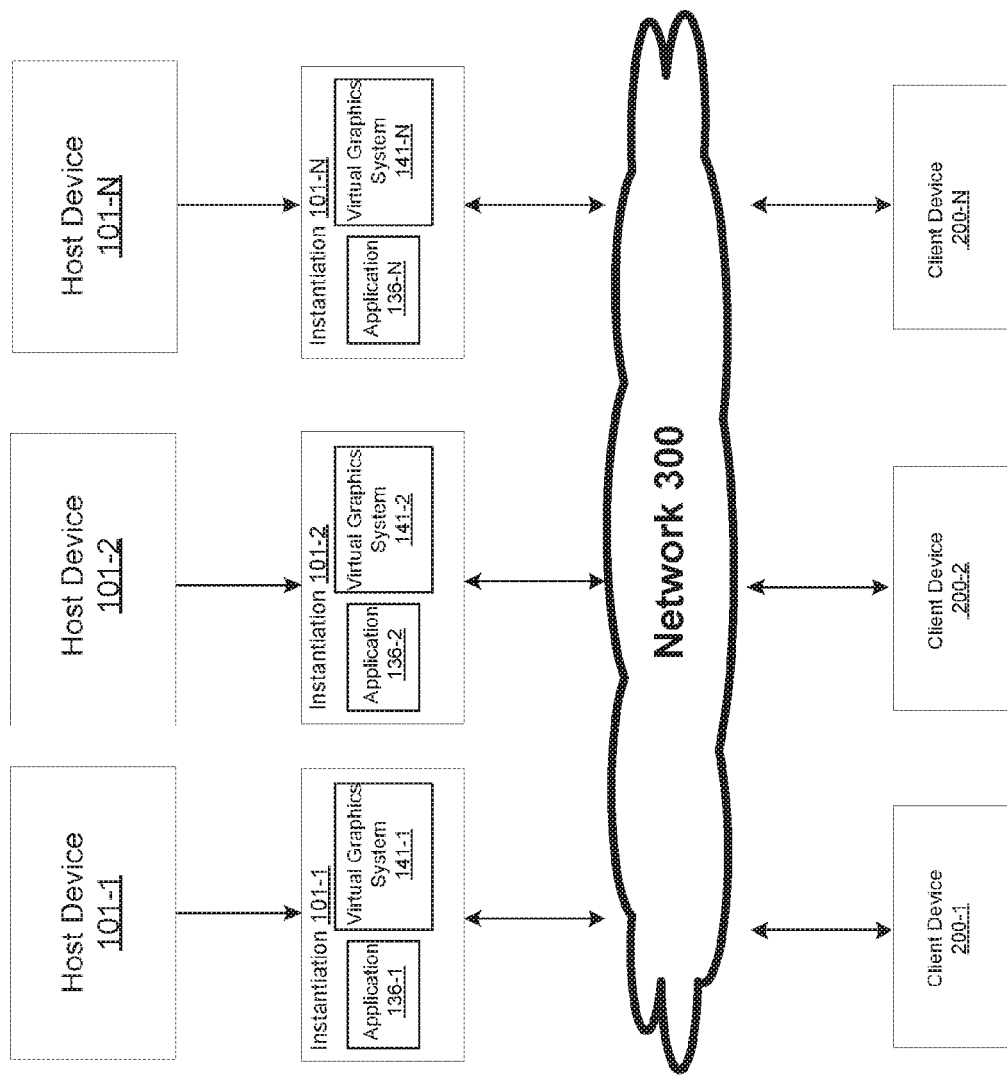
FIG. 5 provides another illustration of a method of remote communication depicting the flow of data between a client device and a host device in accordance to embodiments of the present invention.

FIG. 5 provides another exemplary network communication involving multiple host devices (e.g., host devices 101-1 through 101-N) connected to a plurality of client devices that are in accordance with embodiments of the present invention. In one embodiment, host devices 101-1 through 101-N may be implemented as virtual hosts within host device 101. Each host device may be communicatively coupled to a number of client devices over a given network (e.g., client devices 200-1 through 200-N over network 300). Client devices 200-1 through 200-N are depicted in FIG. 5 as remote devices that are independent of each host device. Therefore, client devices 200-1 through 200-N may rely on a host device to store and execute an application. Furthermore, in response to the state vector input from the client devices 200-1 to 200-N, virtual graphics systems may be used by embodiments of the present invention to generate display data. The display data may be encoded using a common, widely used, and standardized scheme such as H.264.

In one embodiment, with reference to FIG. 5, client devices 200-1 through 200-N may each receive different applications (e.g., applications 136-1, 136-2 and 136-3) from a different host device (e.g., host devices 101-1, 101-2 and 101-N, respectively). In one embodiment, client devices 200-1 through 200-N may each provide state vector data input for their respective applications, which may then be transmitted to their respective host devices through their respective instantiation (e.g., instantiations 101-1 through 101-N, respectively).

According to one embodiment of the present invention, instantiation 101-1 comprises virtual graphics system 141-1 and application 136-1. Virtual graphics system 141-1 is utilized by the application 136-1 to generate display data (output data) related to application 136-1. The display data related to instantiation 101-1 is sent to client device 200-1 over network 300. Similarly, instantiation 101-2 comprises virtual graphics system 141-2 and application 136-2. In parallel, in response to the state vector input from the client device 200-2, virtual graphics system 141-2 is utilized by application 136-2 of instantiation 101-2 to generate display data (output data) related to application 136-2. The display data related to instantiation 101-2 is sent to client device 200-2 over network 300. Furthermore, instantiation 101-N comprises virtual graphics system 141-N and application 136-N. In parallel, in response to the state vector input from the client device 200-N, virtual graphics system 141-N is utilized by application 136-N of instantiation 101-N to generate display data (output data) related to application 136-N. The display data related to instantiation 101-N is sent to client device 200-N over network 300.

In another embodiment, host devices (e.g., host devices 101-1, 101-2 and 101-N, respectively) may execute different instantiations of the same application. For instance, each host device may execute a copy of application 136 that is different from another host device's copy of the application (e.g., using the same software, but on different virtual hosts). In another embodiment, application 136 may have instantiations 136-1 through 136-N executed by client devices 200-1 through 200-N with each device having their own instantiation of application 136 (instantiation 101-1, instantiation 101-2, and instantiation 101-N, respectively illustrated in FIG. 5). Therefore, application 136 may receive input from client devices 200-1 through 200-N independently, but rendering response to received inputs in a manner such that each client device receives its own view of the same application (e.g., multiplayer games designed for cloud gaming).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A processor comprising:
processing circuitry to:
receive first data representative of a first composite state of one or more input devices of a remote device during a first sampling interval;
receive second data representative of a second composite state of the one or more input devices of the remote device during a second sampling interval subsequent the first sampling interval;
determine that a third composite state of the one or more input devices of the remote device during a third sampling interval between the first sampling interval and the second sampling interval was not received;
compare at least one first vector representative of the first composite state to at least one second vector representative of the second composite state to determine at least one user input event corresponding to the third sampling interval;
generate display data based at least in part on the at least one user input event; and
transmit the display data to the remote device.

2. The processor of claim 1, wherein the second composite state is representative of states of each of the one or more input devices during both the second sampling interval and the third sampling interval.

3. The processor of claim 1, wherein the determination includes identifying a failure to receive the third composite state.

4. The processor of claim 1, wherein:
the generation of the display data includes rendering the display data; and
the transmission of the display data includes streaming the display data to the remote device.

5. The processor of claim 1, wherein:
the processor is comprised in a cloud gaming environment;
the cloud gaming environment includes a plurality of remote devices, including the remote device, in communication with a server including the processor over a network;
the generation of the display data is further based on another user input event from at least one other remote device of the plurality of remote devices; and
the transmission of the display data is further to the at least one other remote device of the plurality of remote devices.

6. The processor of claim 1, wherein the comparison includes determining differences between the first composite state and the second composite state.

7. The processor of claim 1, wherein:
the first composite state corresponds to a current composite state prior to the receiving the second composite state;
when the first composite state is determined to be different from the second composite state, the second composite state is stored as an updated current composite state; and
when the second composite state is determined to be equal to the first composite state, the first composite state remains as the current composite state.

8. The processor of claim 1, wherein a time interval for receiving composite states is known, and the determination that the third composite state of the one or more input devices of the remote device during the third sampling interval between the first sampling interval and the second sampling interval was not received includes determining that a composite state was not received within an iteration of the time interval.

9. The processor of claim 1, wherein the first data and the second data are received over a network using a User Datagram Protocol (UDP).

10. A method comprising:
receiving, at a server and from a remote device, first data representative of a current composite state of one or more input devices of the remote device during a current sampling interval, the current composite state representative of states of the one or more input devices during the current sampling interval and a preceding sampling interval prior to the current sampling interval;
comparing one or more first vectors representative of the current composite state to one or more second vectors representative of a stored composite state, the stored composite state representative of a last composite state received by the server prior to the current composite state;
determining, based at least in part on the comparing, that the server failed to receive a composite state of the one or more input devices corresponding to the preceding sampling interval;
determining, based at least in part on the current composite state and the comparing, one or more user input events corresponding to the preceding sampling interval; and
transmitting second data representative of a rendering to the remote device, the rendering generated based at least in part on the one or more user input events.

11. The method of claim 10, further comprising generating the second data representative of the rendering at the server.

12. The method of claim 10, wherein:
the method is executed in a cloud gaming environment;
the cloud gaming environment includes a plurality of remote devices, including the remote device, in communication with the server over a network; and
the rendering is further generated based at least in part on one or more additional user input events corresponding to at least one of the plurality of remote devices other than remote device.

13. The method of claim 10, wherein the comparing includes determining differences between the current composite state and the stored composite state.

14. The method of claim 10, wherein the stored composite state and the current composite state are represented in a vector format.

15. The method of claim 10, wherein a time interval for receiving composite states is known to the server, and the determining, based at least in part on the comparing, that the server failed to receive the composite state of the one or more input devices corresponding to the preceding sampling interval includes determining that the composite state was not received within an iteration of the time interval.

16. The method of claim 1, wherein the current composite state is represented in vector format, the first data is received in an encoded format, and the method further comprises decoding the first data to determine the one or more second vectors representative of the current composite state.

17. A system comprising:
one or more processing units; and
one or more memory units storing instructions thereon that, when executed using the one or more processing units, cause the one or more processing units to execute instructions comprising:
generating, in a vector format, first data representative of a first composite state of one or more input devices during a first sampling interval;
transmitting the first data to a remotely located server;
generating, in the vector format, second data representative of a second composite state of the one or more input devices during a second sampling interval subsequent the first sampling interval;
transmitting the second data to the remotely located server, the second data being representative of at least a portion of the first composite state such that, based on a failed receipt of the first data at the remotely located server, the remotely located server determines at least one user input event corresponding to the first sampling interval;
receiving, from the remotely located server, display data generated by the remotely located server based at least on the at least one user input event; and
displaying the display data.

18. The of claim 17, wherein the generating the first data includes:
generating one or more vectors corresponding to the first composite state; and
encoding the one or more vectors to generate the first data.

19. The system of claim 17, wherein the system includes a client device, the client device is one client device of a plurality of client devices in a cloud gaming environment, and the display data is further generated by the remotely located server based at least in part on one or more additional user input events from one or more other client devices of the plurality of client devices.

20. The system of claim 17, wherein the display data is received from the remotely located server after the remotely located server renders the display data.

* * * * *